Dec. 22, 1959   W. JOSUTIS   2,917,909
FLEXIBLE JOINTS
Filed Sept. 19, 1957   4 Sheets-Sheet 2
Fig.2
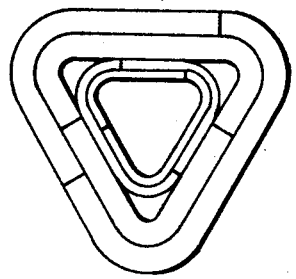
Fig.3
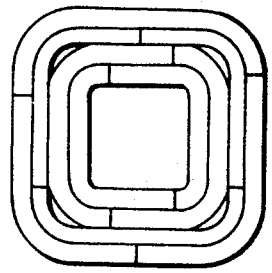
Fig.4
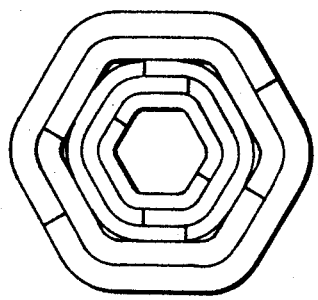
Fig.5
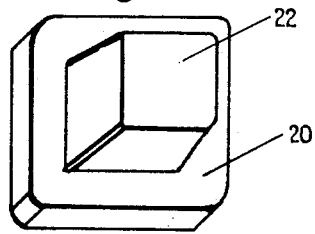
INVENTOR
WILLI JOSUTIS
BY 
ATTORNEY Dec. 22, 1959   W. JOSUTIS   2,917,909
FLEXIBLE JOINTS
Filed Sept. 19, 1957   4 Sheets-Sheet 3
Fig. 6
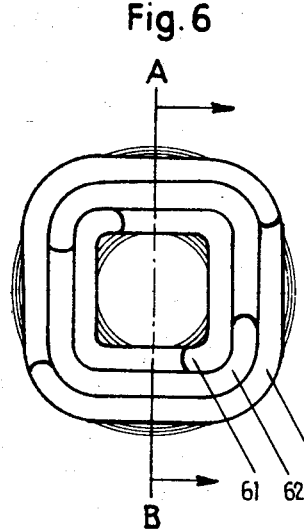
Fig. 7
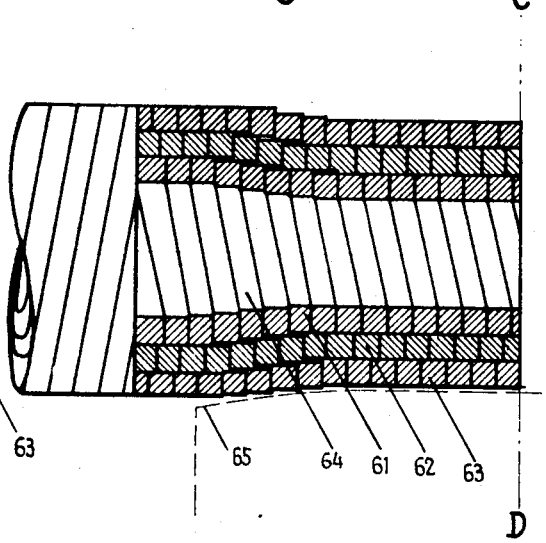
Fig. 8
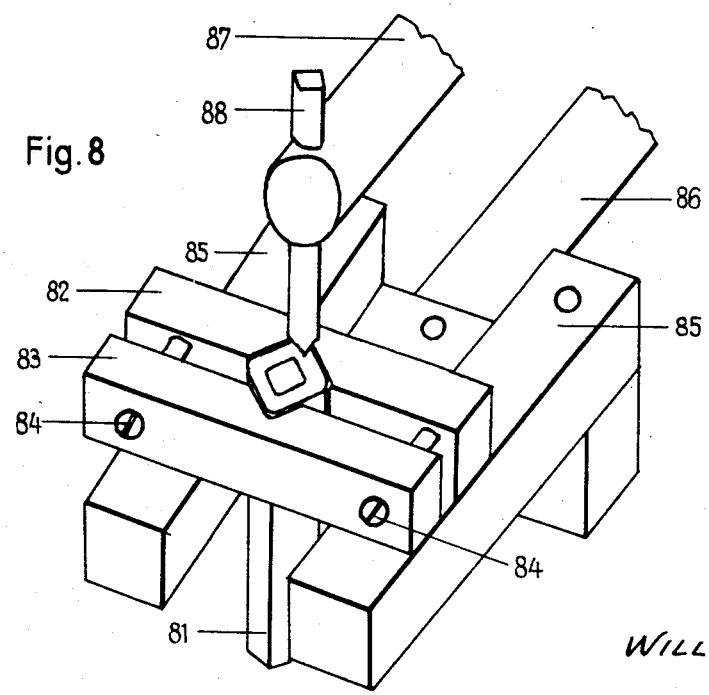
INVENTOR
WILLI JOSUTIS
BY 
ATTORNEY Dec. 22, 1959 W. JOSUTIS 2,917,909
FLEXIBLE JOINTS
Filed Sept. 19, 1957 4 Sheets-Sheet 4
Fig. 9
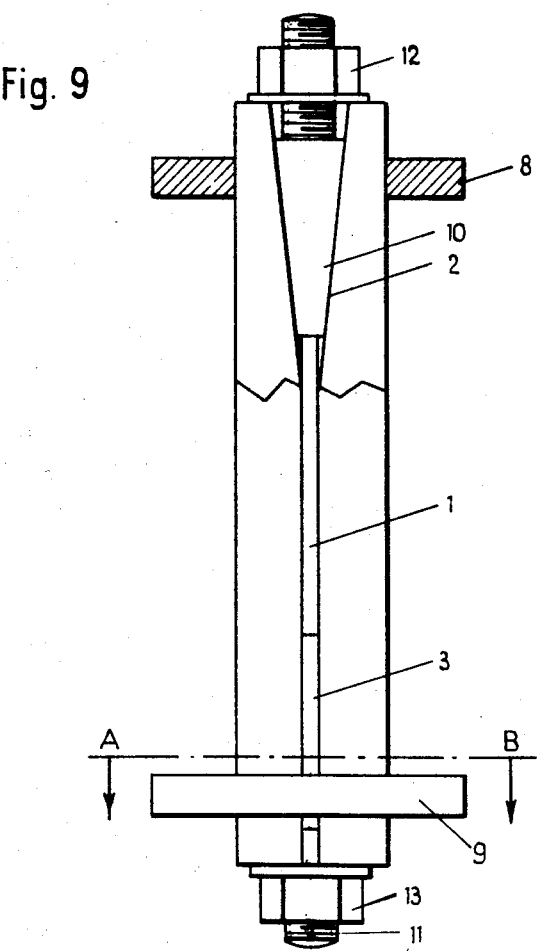
Fig. 10
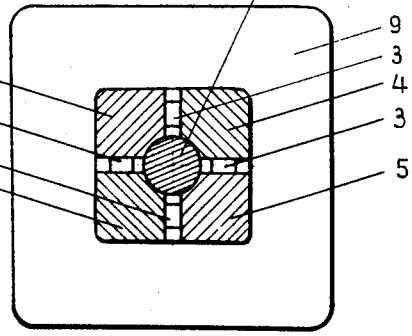
INVENTOR
WILLI JOSUTIS
BY 
ATTORNEY United States Patent Office 2,917,909
Patented Dec. 22, 1959

2,917,909
FLEXIBLE JOINTS
Willi Josutis, Stuttgart-Stammheim, Germany
Application September 19, 1957, Serial No. 684,907
Claims priority, application Germany September 28, 1956
4 Claims. (Cl. 64—2)

This invention relates to a flexible joint of the type as used for the transfer of forces between rotating shafts whose mutual position is subject to changes during operation. Such conventional types of flexible joints, however, bear the advantage over the universal-, ball- or disk-type joints insofar as the extension of the two shafts that are to be connected do not need to meet exactly in one point. Furthermore, flexible joints require less maintenance and are more robust in operation.

The object of this invention is to improve the conventional types of flexible joints. This refers on one hand to the manufacture and, on the other hand, particularly to the coupling between the flexible joint itself and the driving as well as the driven shaft.

It is a special object of the invention to reliably transfer on one hand the forces between both the driving and the driven shaft and, on the other hand, to the flexible joint, and to simplify this coupling as far as possible.

According to one feature of the invention the flexible joint is designed as a hollow shaft having at least at the two ends an internal cross-section differing from the circular shape and which, similar to a socket wrench, is attached to a shaft terminal of the driving or the driven shaft respectively.

For permitting the transfer of greater forces, the hollow shaft, in accordance with another feature of the invention, may in addition have an external cross-section differing from the circular shape, and which is engaged from the outside by the driving or the driven shaft respectively.

Further features of this invention are directed to methods of manufacturing the hollow shafts, which are designed as wire strands. According to another feature of the invention the cross-section, which differs from the circular shape, may be pressed in the cold condition to the end of the shaft originally stranded circularly.

In the following these and other features of the invention will be described fully with reference to some exemplified embodiments shown in Figs. 1 through 10 of the accompanying drawings.

Figs. 2, 3 and 4 show some views of cross-sectional elevations of a flexible joint, taken on line A—B of Fig. 1.

Fig. 5 shows an intermediate member of the type as used for the lower coupling of the flexible joint in accordance with the showing of Fig. 1.

Figs. 6 and 7 show a flexible joint to which the cross-section, that differs from the circular shape, is pressed in the cold condition.

Fig. 8 shows a welding arrangement with the aid of which the wire terminals of the flexible joint are welded to one another.

Figure 1:
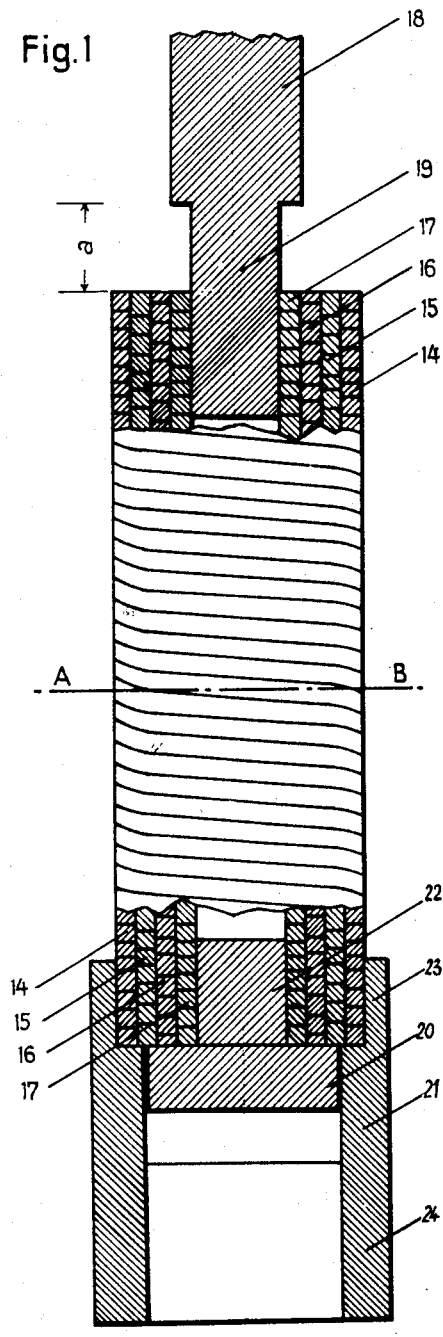
Fig. 1 shows a flexible joint according to the invention, at the upper end of which the coupling to a driving shaft is accomplished with the aid of a polygonal shaft terminal. At the lower end the internal portion as well as the external portion of the hollow shaft are used for establishing the coupling with either a driving or a driven shaft.

In Figs. 9 and 10 there is shown a stranding mandrel by means of which the flexible joints may be stranded in a manner as shown in Figs. 1 through 4 of the drawings.

At first reference is made to Figs. 9 and 10 of the drawings. By means of the stranding mandrel, as shown therein, it is rendered possible to strand the flexible joints according to Fig. 1. The stranding body consists of a profiled steel, e.g. of a square steel, as shown in the drawings. This body is at first provided with a through-going boring 1 and is then conically opened by boring at both ends. With respect to one end, this is shown at 2. Thereupon the square steel body is cut open crosswisely in the longitudinal direction, as is illustrated by the indents 3 in Fig. 10. In this way there will be obtained the four parts 4, 5, 6 and 7. Two limiting plates 8 and 9 are then provided with a hole corresponding to the shape of the profiled steel employed, viz. in the present example with a rectangular hole. Now the four parts 4 through 7 will be inserted into the openings of the limiting plates 8 and 9. With the aid of the conical pins 10 and 11 these four parts 4 through 7 are pressed outwardly, i.e. toward the inner limiting edges of the said limiting-plate holes 8 and 9. The seating of these limiting plates on the profiled steel body being decisive for the length of the flexible joint. Then the profiled steel body will be subjected to the stranding process, which may be carried out in any desired manner, e.g. on a lathe and, as will be described hereinafter, preferably with wires having either a rectangular or square cross-section, and with so many layers as correspond to the force that is supposed to be transferred through the flexible joint. The stranding is performed continuously so that successive layers will have an opposite sense of rotation. Hence with the aid of such a stranding method there will be obtained a body consisting of wound or stranded springs as is shown in a front view and sectional elevation in Fig. 1, and in a cross-sectional view in Fig. 3. Upon completion of the wire strand the conical pins 10 and 11 will be loosened by tightening the screw nuts 12 and 13. Thereafter the flexible joint may be easily removed from the stranding body. Of course, by correspondingly modifying the shape of the stranding body there may also be obtained a triangular cross-section, as shown in Fig. 2, as well as a hexagonal cross-section as shown in Fig. 4 of the drawings.

As already mentioned hereinbefore the wire strength as well as the number of layers depends on the forces to be transmitted. When two layers are stranded then there will result a flexible joint capable of transferring the same torque in both ways. As may be taken from the showing of Figs. 1 through 4 there may, of course, also be employed several layers. Likewise there may be used wires with different cross-sections and different wire strengths or sizes. Hence, unlike the conventional types of flexible joints, here the individual layers are not slipped or inserted into each other, but are directly stranded upon each other. In the present example according to Fig. 1 there is produced a flexible joint comprising the layers 14, 15, 16, 17.

The flexible joint thus obtained is denoted in Fig. 8 by the reference numeral 81 and is clamped with the aid of the screws 84 between two copper jaws or clamps 82 and 83. These jaws 82 and 83, by means of a fork-shaped member 85, are clamped upon the lower electrode arm 86 of an electric spot-welding machine not shown in detail herein. The upper electrode arm 87 of this welding machine is provided with a rectangular electrode 88. This square type electrode is now inserted into the internal hollow of the flexible joint 81, whereupon the circuit for the welding process is completed. On account of this the wire ends of the flexible joint will be firmly connected with one another by way of the conventional spot- and butt-welding process. Thereupon the flexible joint will be removed from the welding machine and the ends thereof subjected to a surface grinding process.

The driving shaft 18 in the upper portion of Fig. 1, provided that the cross-section of the shaft is produced in accordance with Fig. 3, has a rectangular shaft terminal 19 that is inserted into the internal portion of the hollow shaft produced by the stranded wires, and is thus capable of reliably transferring the torque of shaft 18 to the flexible joint. As will be easily seen, the shaft terminal 19, which is inserted somehow like a socket wrench into the flexible joint, can be shifted or displaced in the longitudinal direction of the flexible joint during the operation, e.g. gives way to about the amount (range) as indicated by $a$ in the drawing.

In cases where the strength of the shaft terminal inserted into the internal portion of the hollow shaft is insufficient for transferring the necessary torque, there may be used the arrangement, which is shown in the lower portion of Fig. 1, and which is intended to effect the coupling between the flexible joint and the driving or the driven shaft respectively. In this arrangement there is used an intermediate member, which may be seen from Fig. 5 of the drawings. This consists of one piece with a square head 20, and its cross-section corresponds to the internal cross-section of a coupling box 21 shown in Fig. 1. The smaller square-shaped terminal 22 of the intermediate member according to Fig. 5 is inserted into the inside of the flexible joint, as illustrated in Fig. 1. Thereupon the coupling box 21 is brought into position, the end 23 of which is adapted to embrace the outer circumference of square cross-section of the the flexible joint. The front portion 24 of the coupling box 21 may have a circular cross-section and is slipped onto the driving or driven shaft respectively, to which it will be connected in the conventional manner, e.g. by means of pins or wedges. In this way there is established a coupling between the flexible joint and the driving or driven shaft which is capable of receiving great torques, and yet only requires a slight increase in diameter of the shaft or flexible joint respectively. Accordingly, the invention provides an arrangement saving considerable space.

The flexible joint as shown in Figs. 6 and 7 consists of three layers 61, 62, 63 of square wire, which are stranded in opposite senses. As will be seen, Fig. 7 shows a sectional elevation partly taken on line A—B of Fig. 6, and which partly shows the flexible joint in a front view. Fig. 6 shows a sectional elevation taken on line C—D of Fig. 7. In the right-hand portion of Fig. 7, respectively in the front portion of Fig. 6 the flexible joint has a quadratic cross-section, which gradually (in Fig. 7 toward the left, in Fig. 6 toward the rear) changes to a circular cross-section. This circular cross-section is finally reached approximately at the winding or turn labelled 64.

For manufacturing the flexible joint as shown in Figs. 6 and 7 it is appropriate to start out from relatively large running lengths of flexible shafts with a circular cross-section. These are manufactured in the conventional manner on the well-known automatic spring coiling machines. No special kinds of facilities or devices are required. At certain spaced relations, which correspond to the respective lengths of the flexible joints, the square portions are then produced by way of cold pressing with the aid of hydraulic presses of the conventional type. The jaws of the pressing device have a shape as indicated by the hatchline 65 in Fig. 7, so that the square shape will gradually change over to a circular shape. Due to this gradual transition or change-over there will be avoided the unwanted twisting and the kerf effects at the individual wires. Most appropriately the pressing process is extended to the ends of two adjoining flexible joints. On the right of the line C—D, and symmetrically in relation to the flexible joint shown in Fig. 7, there is to be imagined the adjoining one. The jaws of the pressing device will then extend in a mirrored manner with respect to line 65 and toward the right. After in this way the square end of two adjoining flexible joints is produced on the long piece or continuity, they are separated from each other as well as from the long piece, in the middle of the pressed joints, viz. along the line C—D, with the aid of a cutting-off or parting tool (not shown). The further manufacturing process is then carried out in the manner as described in the foregoing. The coupling between the driving and the driven shaft is effected in the way as described with reference to Fig. 1.

The manufacturing process with respect to the non-circular types of flexible joints, however, may be simplified when choosing an oval instead of a square cross-section. In such a case only two pressing jaws are required for the pressing process. This is also the case when employing an oblong rectangular cross-section.

The foregoing embodiments of the invention have only been described by way of example. I do not desire to limit my invention to the precise details of construction and arrangement as herein specified, as it is obvious that various modifications may be made therein without departing from the essential features of my invention as defined in the appended claims.

Having thus described my invention, I claim:

1. A flexible coupling member for transmitting torque between a pair of generally aligned shafts having ends of polygonal cross section, comprising a plurality of concentric tubular elements composed of helically wound wire, successive convolutions of each element being in substantial contact, the adjacent elements being closely spaced and being of opposite pitch, each of said elements having a plurality of convolutions at each end permanently joined together and to the corresponding convolution of the adjacent element to provide a unitary end structure, the end portions of said member having an end opening of polygonal cross section adapted to receive the correspondingly shaped end portions of the shafts to be coupled.

2. A flexible coupling as set forth in claim 1 in which said end convolutions are welded together.

3. A flexible coupling member for transmitting torque between a pair of generally aligned shafts having ends of polygonal cross section, comprising a plurality of concentric tubular elements composed of helically wound wire, successive convolutions of each element being in substantial contact, the adjacent elements being closely spaced and being of opposite pitch, each of said elements having a plurality of convolutions at each end permanently joined together and to the corresponding convolutions of the adjacent element to provide a unitary end structure, the said end convolutions being of polygonal form to provide inner and outer polygonal surfaces for engagement with correspondingly shaped end portions of the shafts to be coupled.

4. A flexible coupling member for transmitting torque between a pair of shafts having ends of polygonal cross section, comprising a plurality of concentric tubular elements composed of helically wound wire, the adjacent elements being of opposite pitch, each of said elements having a plurality of convolutions at each end permanently joined together and to the corresponding convolutions of the adjacent element to provide a unitary end structure, the end portions of said member having an end opening of polygonal cross section adapted to receive the correspondingly shaped end portions of the shafts to be coupled.

References Cited in the file of this patent

UNITED STATES PATENTS

| | | |
|---|---|---|
| 393,065 | Gare | Nov. 20, 1888 |
| 1,649,310 | Joline | Nov. 15, 1927 |
| 1,808,194 | Webb | June 2, 1931 |
| 1,871,528 | Joline | Aug. 16, 1932 |
| 2,023,693 | Miller | Dec. 10, 1935 |
| 2,170,627 | Berryman | Aug. 22, 1939 |
| 2,332,859 | Kreissing et al. | Oct. 26, 1943 |
| 2,652,623 | Marden | Sept. 22, 1953 |